April 20, 1943. A. H. YOCH 2,317,239

BILLET NICKING MACHINE

Filed Jan. 9, 1942 2 Sheets-Sheet 1

INVENTOR.
August H. Yoch
BY J. F. Brandenburg
ATTORNEY

Patented Apr. 20, 1943

2,317,239

UNITED STATES PATENT OFFICE 2,317,239

BILLET NICKING MACHINE

August H. Yoch, Philadelphia, Pa., assignor to Air Reduction Company, Incorporated, New York, N. Y., a corporation of New York Application January 9, 1942, Serial No. 426,155

11 Claims. (Cl. 266—23)

This invention relates to apparatus for nicking billets for the manufacture of shell stock blanks, or relative small stock pieces for other purposes.

An expeditious method for making long billets into short lengths for shell stock blanks has been to nick the billets at spaced points with oxygen cutting torches and then break the billet at the nicks. The application of the torch heat, along with the high local temperature resulting from the cutting reaction, causes expansion of the metal, and because of the restraining action of the base metal, the metal adjacent to the cut is upset. This effect, combined with the quench action of the cold mass of metal, causes the adjacent areas to be highly stressed. When the elastic limit is exceeded, a crack is produced or can be started by the application of shock or pressure. This method of nicking and breaking provides a clean natural fracture, which is required under certain inspection procedures.

It is an object of this invention to provide improved apparatus for nicking billets at uniformly spaced regions preparatory to breaking the billet into short lengths.

A more particular object of the invention is to nick billets faster, and another object is to provide apparatus that is more convenient to operate and that can be used for constantly repeated nicking operations with a minimum of wear and tear on the torch translating apparatus.

As billets move along a conveyor or mill table, they are stopped for each nicking operation, and the nicking machine can easily be the "bottleneck" of the mill production. With this invention the delay for nicking is reduced by making a plurality of nicks at spaced regions lengthwise of the billet at the same time.

One feature of the invention relates to mechanism for starting and stopping the movement of the nicking torches. The invention obtains quick and smooth starts with the utmost convenience of control, and provides mechanism that is subject to no appreciable wear and tear as the result of the multitudinous starts and stops inevitably encountered in billet nicking work.

Other objects, features, and advantages of the invention will appear or be pointed out as the specification proceeds.

In the accompanying drawings, forming a part hereof:

Figures 1, 2:
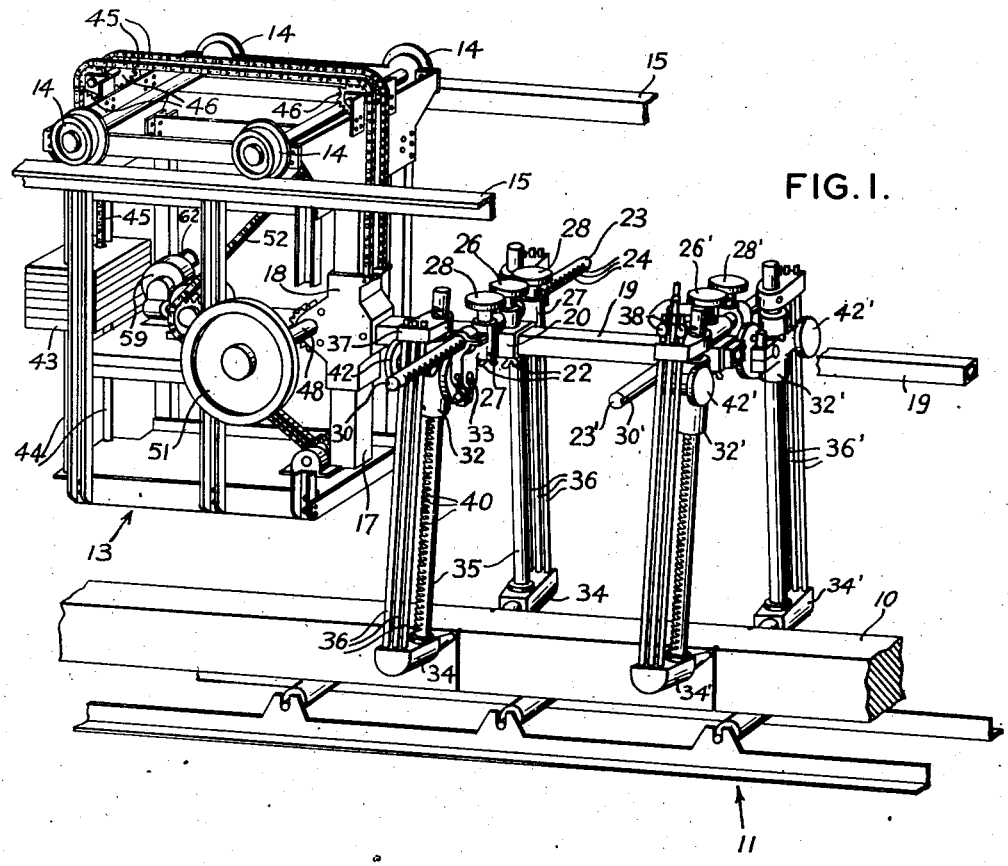
Fig. 1 is a perspective view of a billet nicking machine embodying this invention.
Fig. 2 is an enlarged, diagrammatic, detail view of the starting and stopping mechanism.

A billet 10 is supported on the rollers of a conveyor or mill table 11. The billet remains stationary on the conveyor during a nicking operation.

A carriage 13 has wheels 14 that run on rails 15 extending parallel to the billet 10. The attendant moves the carriage 13 by hand along the rails 15 into the desired location lengthwise of the billet, or the carriage may be left at one location and the billet moved along the conveyor to obtain the desired relation of the carriage and billet. A vertically-extending guide, preferably a square bar or tube 17 is rigidly connected at its upper and lower ends with the other structure of the carriage 13.

A frame 18 fits over the tube 17 and slides up and down on the tube 17 as a guide. A torch-supporting arm 19 is rigidly connected at one end to the frame 18 and extends forward parallel to the top surface of the billet 10.

Figure 3:
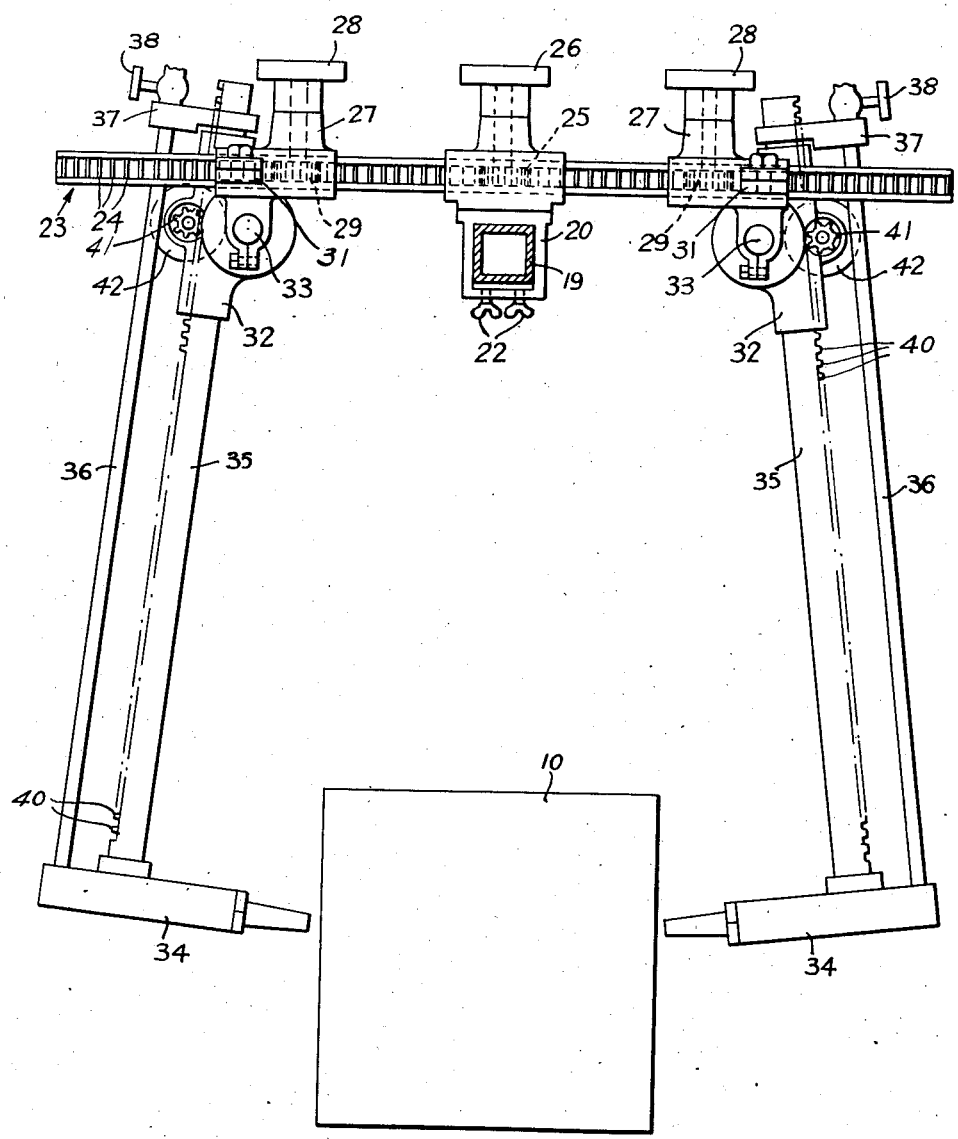
Fig. 3 is an enlarged detail view of the torch adjusting apparatus.

A bracket 20 is slidable along the arm 19 but can be secured in any set position by set screws 22. A cross bar 23 extends through a bearing in the bracket 20. There are rack teeth 24 on one side of the cross bar 23 and these rack teeth engage with a pinion in the bracket 20. The pinion 25 (Fig. 3) is turned by a knob 26 to shift the cross bar one way or the other in the direction of its length.

There is a torch-holder bracket 27 on the cross bar 23 on each side of the center bracket 20. Each of the brackets 27 has a knob 28 that turns a pinion 29 meshing with the rack teeth 24 to shift the torch-holder bracket 27 lengthwise along the cross bar 23. Although slidable along the cross bar 23, each of the torch-holder brackets 27 has a key that extends into a keyway 30 (Fig. 1) in the side of the bar 23 opposite the rack teeth to prevent angular movement of the bracket 27 on the cross bar 23. A similar key in the center bracket 20 prevents rotation of the cross bar 23 in the center bracket. A split clamp 31 (Fig. 3) on the end of bracket 27 extends around the bar 23 and is adjusted to control the friction of the bracket on the bar.

A torch-holder 32 has a stud 33 that extends into a split clamp at the lower end of each of the torch-holder brackets 27. The torches used for nicking the billet 10 each comprise a tip 34, a long rod 35 extending upward from the tip, gas supply tubes 36 connected at their lower ends with the tip, and a block 37 at the upper end of the rod 35 for holding the upper ends of the tubes 36 and the valves 38 that control the supply of gas to the tubes. There are rack teeth 40 on the rod 35, and the rod extends through a bearing in the torch-holder. A pinion 41 in the torch-holder meshes with the rack teeth 40 and can be turned by a knob 42 to raise and lower the torch in the holder 32.

The torches on both sides of the billet 10 are the same, and so are the torch-holders 32 except for the necessary reversals to keep the adjusting knob at the back in both torch-holders although the torch-holders support torches, one on the right and the other on the left side of the billet 10. It will be apparent from the description that the spacing of the torches can be changed, to accommodate the apparatus to billets of different width, by turning either of the knobs 28. With the torches adjusted for billets of a particular width, the torches can be moved as a unit to accommodate them to a billet that is not centrally located on the conveyor by turning the knob 26.

In order to increase the production of the apparatus, the arm 19 is made long enough to hold two or more pairs of torches for making a number of nicks simultaneously. The machine shown in the drawings has two extra torches with tips 34' disposed to nick opposite sides of the billet, and adjustable in the same way as the tips 34. Supporting and adjusting structure for the tips 34' corresponding to that for the tips 34 is designated by the same reference characters with a prime appended.

The tips 34 and 34' are spaced from one another by a distance equal to the length of the pieces into which the billet is to be broken up. After a nicking operation the billet 10 is moved with respect to the torches for a distance twice as great as the length of the pieces to be made from the billet. By nicking the billet at two places simultaneously, therefore, the number of operations by the machine is cut in half and the relative movement of the billet and the nicking machine with respect to one another has to be made only one-half as often. By using three pairs of torches at properly spaced regions along the bar 19, these comparisons can be cut from one-half to one-third.

The torch tips 34, 34' traverse the billet 10 when the frame 18 moves along its vertical guide 17. The frame 18 and all of the structure that it supports are counterbalanced by weights 43 (Fig. 1) that move up and down along guide rods 44. The weights 43 are connected to the frame 18 by chains 45 that pass over sprocket wheels 46 at the top of the carriage.

Motor-operated mechanism for moving the frame 18 at a uniform speed during the nicking stroke of the torch tips 34, 34' is shown in detail in Fig. 2. A cross shaft 48 is supported by and rotatable in lugs extending from the back of the frame 18. A sprocket 49 is keyed to the shaft 48 between the lugs in which the shaft 48 turns. The shaft 48 extends from some distance to either side of the frame 18 and has a hand-wheel 51 secured to each end.

A driving element comprising a chain 52 passes around sprocket wheels 53, 54 connected with the carriage and disposed to give the chain 52 a run generally parallel to the guide 17. This run of the chain 52 is engaged by the sprocket 49 and held against this sprocket by rollers 55 on axles 56 supported by the lugs at the back of the frame 18.

The sprocket wheels 53, 54 are idlers, but the chain 52 passes around a sprocket wheel 58 that is driven by an electric motor 59 through reduction gearing 60. The motor operates continuously, and when the frame is stationary the chain 52 rotates the sprocket 49, shaft 48, and hand-wheels 51. The machine shown in the drawings nicks the billets when the torches are moving up and the chain 52 is, therefore, driven in a direction that causes it to move up along the run of the chain that is parallel to the guide 17. If the apparatus were designed to nick the billet during downward movement of the torches, the chain 52 would be driven in the opposite direction.

The lineal speed of the chain 52 is made equal to the desired speed of translation of the torches during their cutting (nicking) stroke. The frame 18 can be made to move upward at the lineal speed of the chain 52 by merely stopping either of the hand-wheels 51. The hand-wheel is, therefore, a control device for operatably connecting the frame 18 with the driving element (chain 52) and thus serves the function of a clutch. The frame 18 can be moved in the opposite direction to return it to its original position, in preparation for the next nicking operation, by manually rotating either of the hand-wheels 51 at a rate faster than the speed at which the chain 52 turns the hand-wheels 51 when the frame 18 is stationary on the guide 17. The motor 59 is equipped with a centrifugal governor 62 (Fig. 1) that is adjustable to control the motor speed and the speed of the chain 52.

The preferred embodiment of the invention has been described, but changes and modifications can be made and some features of the invention can be used without others.

I claim:

1. A billet nicking machine including a frame, a vertical guide on which the frame moves up and down, a support extending horizontally from the frame and parallel to the billet on which the machine operates, said support being movable as a unit with the frame, and a plurality of pairs of torch-holders on the support and spaced from one another lengthwise of the support.

2. Billet nicking apparatus comprising a carriage movable along a course parallel to the length of a billet that is to be nicked, a guide on the carriage extending substantially transverse of the length of the billet, a frame movable along the guide, a torch-supporting arm that extends from the frame parallel to the length of the billet, brackets on said arm spaced from one another lengthwise of the arm, and two torch-holders connected with each bracket and disposed in position to hold torches that extend down along opposite sides of the billet.

3. Billet nicking apparatus including a track that extends parallel to a billet support, a carriage movable along the track lengthwise of a billet on said support, a guide on the carriage extending at right angles to the plane of the top surface of the billet, a frame movable on the guide toward and from the support, a pair of torches one on each side of the billet for making nicks at the same region lengthwise of the billet, another pair of torches, one on each side of the billet for nicking the billet at another region, a bracket supporting one pair of torches, another bracket supporting the other pair of torches, a support for said brackets extending from the frame parallel to the length of the top surface of the billet, said support being movable as a unit with the frame, and means for holding the brackets in different positions lengthwise of the support for adjusting the distance between the regions of the billet where the torches operate to nick the billet surface.

4. A billet nicking machine including a frame for supporting torches on opposite sides of a billet, a guide on which the frame is movable up and down in a direction parallel to the nicks that are made by the machine, means for maintaining the frame at selected levels along the guide, a driving element that moves the frame along said guide at the correct cutting speed for the torches supported by the frame, and means for operably connecting the frame with the driving element including an operator-actuated control device.

5. Billet-nicking apparatus comprising a movable frame for traversing a plurality of torches over opposite faces of a billet to nick the billet, a vertically-extending guide on which the frame moves up and down during the nicking operation, means for maintaining the frame at selected levels along the guide, a motor, a chain driven by the motor at a speed equal to the desired speed of translation of said torches, wheels over which the chain passes with one run of the chain generally parallel to the guide, and means for operably connecting the frame to the chain for movement along the guide at a definite speed.

6. A billet nicking machine including in combination a torch-supporting frame, a guide along which the frame moves to shift torches across the billet during a nicking operation, a chain that has a run extending generally parallel to the guide, a shaft journaled in the torch-supporting frame, a sprocket on said shaft in position to engage the chain and be rotated by the chain when the frame is stationary, a motor that drives the chain continuously at the desired speed of translation of the torches, and a hand-wheel on the shaft for stopping rotation of the shaft to cause the torch-supporting frame to move with the chain.

7. In a billet nicking machine having a frame movable along a guide, the improved driving mechanism including a chain with one run extending generally parallel to the guide, a shaft that turns in bearings in the frame, a sprocket secured to the shaft and engaging the run of chain that is generally parallel to the guide, and a motor for driving the chain continuously, and a hand-wheel on the end of the shaft that rotates with the shaft and that is normally stopped to cause the frame to move with the chain or rotated faster than it is driven by the chain to cause the frame to move in the opposite direction from the chain.

8. A billet nicking machine including a track that extends parallel to a billet support, a carriage movable along the track lengthwise of a billet on said support, a guide on the carriage extending at right angles to the plane of the top surface of the billet, a frame movable on the guide toward and from the support, a pair of torch-holders for supporting torches on opposite sides of the billet, another pair of torch-holders spaced from the first torch-holders in the direction of the length of the billet, a support for the torch-holders extending from the frame and movable as a unit with the frame, an endless chain that passes around wheels supported by the carriage, said wheels including a driving sprocket wheel, and said chain having a run generally parallel to the guide, a motor on the carriage for rotating the driving sprocket wheel continuously and at a uniform rate, an adjustable governor for controlling the motor speed, a shaft journaled in the frame, a sprocket wheel secured on said shaft in position to engage the run of the chain that is parallel to the guide, and a hand-wheel on each end of the shaft for stopping rotation of the shaft to operably connect the frame to the continuously moving chain.

9. A billet nicking machine including a vertically movable frame, a support extending horizontally from the frame and substantially parallel to the top surface of the billet when the machine is in position for nicking the billet, torch-holders supported from the support, racks extending downward from the torch-holders, one on each side of the billet, a torch tip at the lower end of each of the racks, and independent means for adjusting the racks on the opposite sides of the billet.

10. A billet nicking machine including a frame, a torch-supporting arm extending from the frame substantially parallel to the top surface of a billet that is to be nicked and in the direction of the length of the billet, a cross bar carried by the arm, two torch-holder brackets on the cross bar, means for shifting the torch-holder brackets toward or from one another along the cross bar to adjust the machine for billets of different width.

11. A billet nicking machine as called for by claim 10 with adjusting means for moving the cross bar with respect to the supporting arm and in the direction of the length of the cross bar for adjusting both of the torches as a unit.

AUGUST H. YOCH.

CERTIFICATE OF CORRECTION.

Patent No. 2,317,239.   April 20, 1943.

AUGUST H. YOCH.

It is hereby certified that error appears in the printed specification of the above numbered patent requiring correction as follows: Page 3, first column, line 53, claim 7, for "normally" read --manually--; and that the said Letters Patent should be read with this correction therein that the same may conform to the record of the case in the Patent Office.

Signed and sealed this 25th day of May, A. D. 1943.

(Seal)

Henry Van Arsdale,
Acting Commissioner of Patents.